United States Patent [19]

Baer et al.

[11] Patent Number: 4,653,056
[45] Date of Patent: Mar. 24, 1987

[54] ND-YAG LASER

[75] Inventors: Thomas M. Baer, Mountain View; Mark S. Keirstead, San Jose, both of Calif.

[73] Assignee: Spectra-Physics, Inc., San Jose, Calif.

[21] Appl. No.: 730,002

[22] Filed: May 1, 1985

[51] Int. Cl.$^4$ .............................................. H01S 3/10
[52] U.S. Cl. ........................................ 372/27; 372/22; 372/108; 372/9; 372/34; 372/21; 372/71
[58] Field of Search ...................... 372/41, 69, 30, 21, 372/27, 71, 26, 108, 22, 9

[56] References Cited

U.S. PATENT DOCUMENTS

| | | | |
|---|---|---|---|
| 3,982,201 | 9/1976 | Rosenkrantz et al. | 372/75 |
| 4,035,742 | 7/1977 | Schiffner | 372/6 |
| 4,272,733 | 6/1981 | Walling et al. | 372/41 |
| 4,383,318 | 5/1983 | Barry et al. | 372/6 |
| 4,553,238 | 11/1985 | Shaw et al. | 372/66 |

OTHER PUBLICATIONS

Farmer et al., "Solid State Pumping Source for Nd:YAG Lasers with Integrated Focusing Optics", IBM Technical Disclosure Bull., vol. 15, No. 1, Jun. 1972.
Chinn, "Intracavity Second-Harmonic Generation in a Nd Pentaphosphate Laser", Appl. Phys. Lett., vol. 29, (1976), p. 176.
Culshaw et al., "Eff. Freq.-Doubl. Single-Freq. Nd:YAG Laser", J. Q. E., vol. QE-10, No. 2, (1974), p. 253.
Ostermayer, Jr., "GaAs$_{1-x}$P$_x$ Diode Pumped YAG:Nd Lasers"; Appl. Phys. Lett., vol. 18, No. 3, (1971), p. 93.
Barnes, "Diode-Pumped Solid-State Lasers"; J. Appl. Phys., vol. 44, No. 1, (1973), p. 230.
Chesler et al; "Miniature Diode-Pumped Nd:YAIG Lasers", Appl. Phys. Lett., vol. 23, No. 5, (1973), p. 235.
Allen et al; "Continuous Operation of a YAIG:Nd Laser by Injection Lumin. Pumping", Appl. Phys. Lett., vol. 14, No. 6, (1969), p. 188.

Primary Examiner—Leon Scott, Jr.
Attorney, Agent, or Firm—Donald C. Feix; Thomas M. Freiburger; Paul Davis

[57] ABSTRACT

A neodymium YAG laser is pumped by a matched laser diode of high efficiency, resulting in a compact, high-efficiency and long-lifetime laser assembly. Output is in the near infrared range, but can be converted to the visible spectrum by an internal frequency doubler. A doubling crystal, which may be a KTP crystal, is placed at an optimum location in the laser cavity. Polarization of the beam may be achieved simply by stressing the YAG rod, prior to frequency doubling.

47 Claims, 6 Drawing Figures

ND-YAG LASER

BACKGROUND OF THE INVENTION

This invention relates generally to lasers, and more particularly to Nd:YAG lasers.

A large number of different kinds of solid lasers have been discovered, distinguished from one another by host material, by active lasing ions with which the host is doped, and by output characteristics. Of these, mainly ruby, Nd:YAG and Nd-doped glass laser systems are of major importance in industrial and laboratory environments. They are particularly useful for materials processing applications which include drilling, welding, cutting and scribing.

A wide variety of Nd:YAG lasers and industrial systems are currently manufactured. Their usefulness and versatility is due in part to the fact that they can be operated in a number of different modes.

However, Nd:YAG lasers have proved to be relatively inefficient and have relatively short lifetimes due to limitations of their pumping sources which are typically arc or incandescent lamps, or light-emitting diodes.

Pumping by arc or incandescent lamps is undesirable due to limited lifetimes. The lamps themselves have lifetimes of a few hundred hours and need periodic replacement. Moreover, they generate unnecessary and damaging ultraviolet radiation which tends to degrade the YAG material itself.

Pumping by light-emitting diodes is undesirable because of limited power and focusability and low efficiency. The wavelength of the emitted light is very broad and does not match the Nd:YAG absorption line. Additionally, light-emitting diodes have a broad emission spectrum which provides inherent limitations when they are utilized as pumping sources for Nd:YAG lasers.

Exemplary Nd:YAG lasers pumped by these sources are disclosed by: F. W. Ostermayer, Jr., *Appl. Phys. Lett.*, Vol. 18, No. 3 (1971) p. 93; N. P. Barnes, *J. Appl. Physics*, Vol. 44, No. 1 (1973) p. 230; R. B. Chesler and D. A. Draegert, *Appl. Phys. Lett.*, Vol. 23, No. 5 (1973) p. 235; R. B. Allen and S. J. Scalise, *Appl. Phys. Lett.*, Vol. 14, No. 6 (1969) p. 188; and W. Culshaw, J. Kanneland and J. E. Peterson, *J. Quart. Elect.*, Vol. QE-10, No. 2 (1974) p. 253.

However, there exists a need for a more efficient, longer life Nd:YAG laser for low to high power applications. A need also exists for a frequency-doubled Nd:YAG laser which has a long lifetime, is efficient and suitable for applications in the visible light range as well as other wavelengths.

SUMMARY OF THE INVENTION

Accordingly, an object of the present invention is to provide an intra-cavity frequency-doubled Nd:YAG laser having high efficiency and a long lifetime.

Another object of the invention is to provide an intracavity frequency-doubled Nd:YAG laser which is relatively compact.

Yet another object of the invention is to provide a diode-pumped intra-cavity frequency-doubled Nd:YAG laser having high efficiency, a long lifetime and which is relatively compact.

Still a further object of the present invention is to provide a diode-pumped Nd:YAG laser with high efficiency, long lifetime, relatively compact design and which is not frequency-doubled.

A further object of the invention is to provide a cavity design for a Nd:YAG laser which allows efficient pumping by a high-power laser diode array and provides efficient intra-cavity frequency-doubling of the YAG to the visible.

Yet another object of the invention is to provide a means for controlling the polarization of a ND:YAG laser to allow efficient intra-cavity frequency-doubling.

Still another object of the invention is to provide a means of controlling the frequency of a laser diode pump source utilized with a Nd:YAG laser.

Another object is to provide efficient methods for producing Nd:YAG laser beams both in the visible spectrum and in the near-infrared range, with a Nd:YAG rod pumped by a laser diode array.

These and other objects of the present invention are achieved by providing a high-efficiency, diode-pumped, compact Nd:YAG laser which comprises a Nd:YAG laser rod having a front end and a back end; a housing with means for holding the Nd:YAG rod in a fixed position therein with its front end forward and a laser diode for pumping the Nd:YAG rod, having an output frequency sufficiently matched to the rod to pump the rod, and secured to the housing behind in alignment with the rod; an output coupler means including a mirrored surface for a front end of a laser cavity and a rear mirror means for the back end of a laser cavity, with the Nd:YAG rod positioned within the cavity; a frequency-doubler within the laser cavity, positioned to receive the output beam of the laser rod to halve its wavelength and double its frequency; and polarization means are included within the laser cavity for polarizing the laser beam in order to facilitate efficient frequency-doubling.

In preferred embodiments, particular features of the diode array-pumped Nd:YAG system of the invention are included for highly efficient and compact construction, as well efficiency in laser pumping, frequency-doubling and polarization of the beam.

The present invention provides an intra-cavity frequency-doubled Nd:YAG laser which allows efficient pumping by a high-power laser diode array. The present invention also provides an expansion of the lasing volume to match the focused image of a laser diode array. An intra-cavity waist is disclosed which provides efficient frequency-doubling.

Diode arrays provide a great deal of power despite the fact that the output beam focusability is limited. With multistrip arrays having, for example ten emitters in a row, each having an elliptical beam configuration, the compilation of the emitted beams adds up to a rectangular geometrical beam which possesses too much spacial structure. Advantageously, the present invention overcomes this disadvantage by providing a cavity designed with functions to expand the lasing volume to match the focused image of the laser diode arrays and, therefore, their high-power efficiency can be utilized despite their poor focusing qualities.

The invention is also advantageous in some applications without frequency-doubling, yielding an efficient near infrared laser beam from low to high power.

In methods according to the invention a Nd:YAG laser rod is pumped by a laser diode to produce an output in the near-infrared range, which may be doubled with intra-cavity frequency doubling to produce a visible beam. Polarizatin of the beam is performed intracavity for efficiency in frequency doubling.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
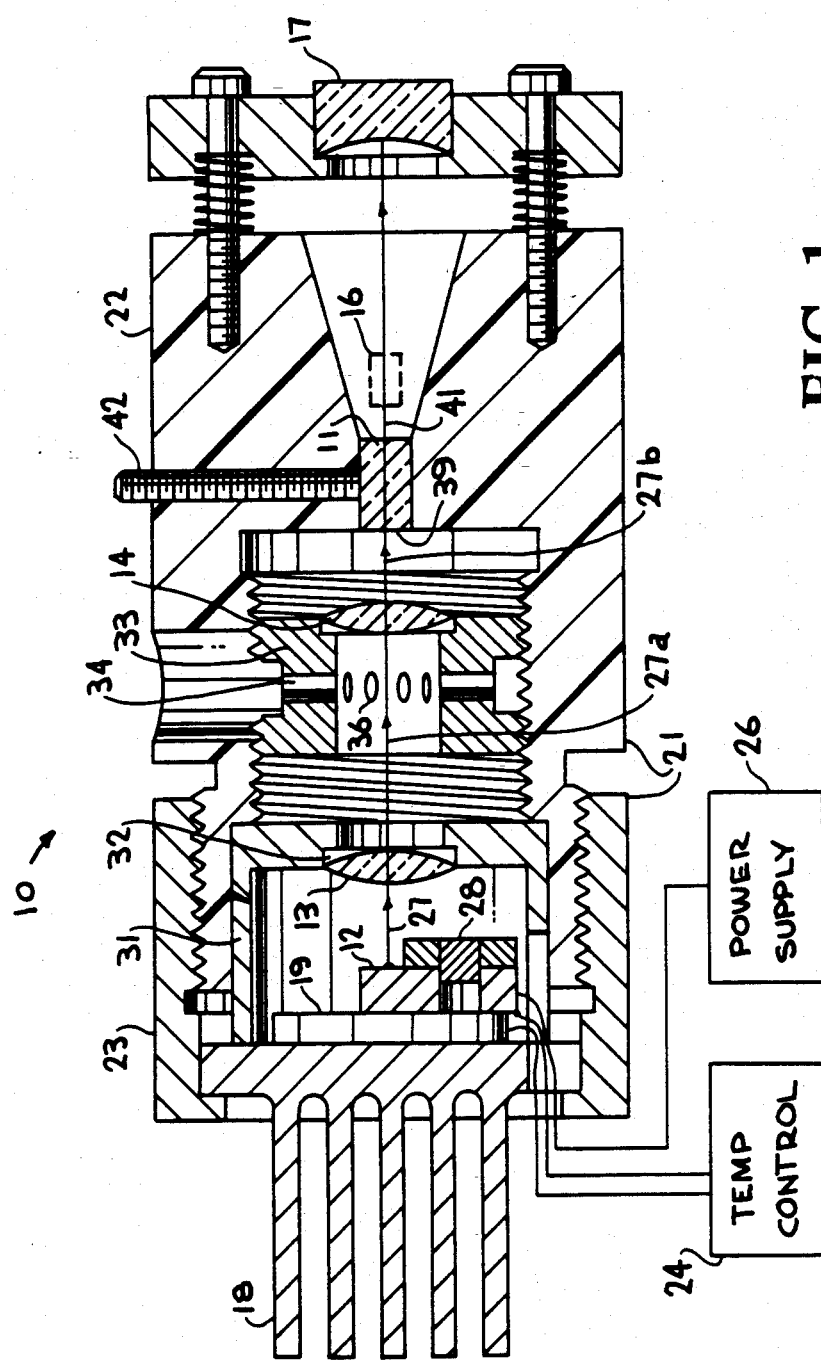
FIG. 1 is a sectional longitudinal view showing a laser diode pumped Nd-YAG laser assembly according to the invention, including a housing, cooling device and other associated components.

In the drawings, FIG. 1 shows a neodymium-YAG laser assembly 10 in a longitudinal sectional view. The major components of the laser 10 are a neodymium-YAG laser rod 11 and a laser diode 12 toward the rear of the assembly. The assembly includes lenses 13 and 14 through which the laser diode beam passes en route to the laser rod 11, a frequency doubler 16 (dashed lines) at the output side of the laser rod, an output coupler 17 (which comprises the front surface of a mirror) at the front end of the assembly, a heat sink 18 at the rear of the assembly, a Peltier cooler 19 between the diode 12 and the heat sink 18, and a housing 21, which may comprise front and rear housing components 22 and 23, to which all of these operating components are attached. Also included with the assembly are a temperature control 24 and a power supply 26.

The power supply 26 delivers electrical power to the laser diode 12, causing it to emit a laser diode beam 27 and creating some waste heat which is removed by the Peltier cooler 19 and the heat sink 18. The temperature control 24 is shown connected to the Peltier cooler 19 to regulate the temperature of the diode and to tune it by temperature to the correct wavelength for pumping of the Nd-YAG laser rod 11. The laser diode 12, which may be a Gallium aluminum arsenide (GaAlAs) laser diode array, as identified as Model No. 2410 manufactured by Spectra Diode Labs of 3333 N. First St., San Jose, Calif., is manufactured to be close to the proper wavelength for excitation of the Nd-YAG rod, but temperature control is required for precise "tuning" of the diode's output beam 27. In one preferred embodiment, the laser diode array 12 emits a beam substantially at 0.808 micron wavelength, the proper wavelength for pumping of the Nd-YAG rod 11. Such a laser diode has an efficiency of about 20%.

As indicated somewhat schematically in the drawing, the diode 12 may be retained in the housing by a diode clamp 28.

A fixed lens mount 31 is secured in a portion of the housing, which may be a rearward end flange 32 of the housing component 22, and retains the lens 13 in fixed position therein. The fixed lens 13 acts as a collimating lens to convert the diverging beam 27 from the laser diode array 12 into substantially a parallel beam.

The collimated laser diode beam 27a then passes through the lens 14, which is a focusing lens, for focusing the beam into the back end of the Nd-YAG crystal 11. As indicated, the focusing lens 14 is adjustable, mounted on an adjustable lens spool 33 which is rotatable within a threaded bore as shown, to adjust the fore and aft position of the lens 14. An opening 34 preferably is provided in the forward housing component 22 for access to the adjustable lens spool 33 to rotate it via a series of holes 36 in the lens spool.

The focused, converging laser diode beam 27b enters the Nd-YAG laser rod 11 and excites the neodymium atoms in the rod to produce a laser beam in the near infrared range.

Figure 4:
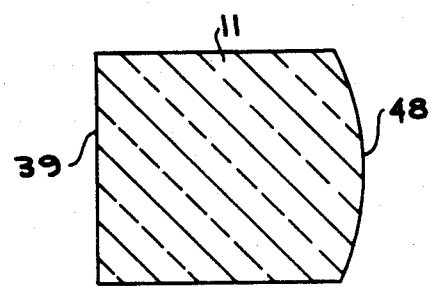
FIG. 4 is an enlarged sectional view of the Nd-YAG rod of the laser system, to indicate special surfaces of the rod.

A laser cavity for the Nd-YAG laser rod is defined between the output coupler 17, which comprises a partially mirrored surface, and an opposing rear mirror located somewhere to the rear of the Nd-YAG rod 11. In one embodiment of the invention, the rear surface 39 of the laser rod 11 itself is coated to be highly reflective at 1.06 micron, serving as the rear mirror of the laser cavity. This is also indicated in FIG. 4, showing the Nd-YAG rod 11 in enlarged view. It should be noted that the term "mirrored" as used herein and in the appended claims, includes partially mirrored.

Forward of the Nd-YAG laser rod 11 is the intracavity frequency doubler 16 which preferably, but not necessarily, is included in the assembly 10. The emerging laser beam 41 from the Nd-YAG laser rod 11 passes through the frequency doubler 16 where its wavelength is halved, doubling its frequency. Preferably, the frequency doubler 16 is a crystal which is a near-ideal frequency doubling element for this purpose, selected from a group including KTP, $LiNbO_3$ and $LiIO_3$. A KTP crystal is a suitable and preferred frequency doubler, being an efficient doubling element in the wavelengths concerned with this invention. The power output of the KTP crystal frequency doubler increases approximately quadratically with increases in the 1.06 micron laser beam power, so that the efficiency of a system utilizing this frequency doubler is much greater at high powers than at low powers.

The laser beam should be polarized within the laser cavity for maximizing efficiency in frequency doubling. This can be accomplished in several different ways.

One preferred method according to the present invention is to simply apply a transverse stress to the Nd-YAG rod 11, which has the effect of creating a beam polarization which is along the axis of the stress.

According to the present invention, the transverse stressing of the laser rod 11 may be accomplished by a simple set screw or stressing screw 42 threaded into the housing component 22 as shown. Since it is important that the transverse stress on the laser rod be substantially constant, it may be beneficial to add a strong compression spring to the assembly including the set screw 42, for example a Belleville washer, between the set screw and the laser rod 11. Although this is not shown in FIG. 1, a schematic indication of a Belleville washer 43 contacted by the set screw 42 is included in FIG. 2A, with the force of the Belleville washer 43 applied to the side of the Nd-YAG rod 11 by a spacer member 44.

Figure 2A:
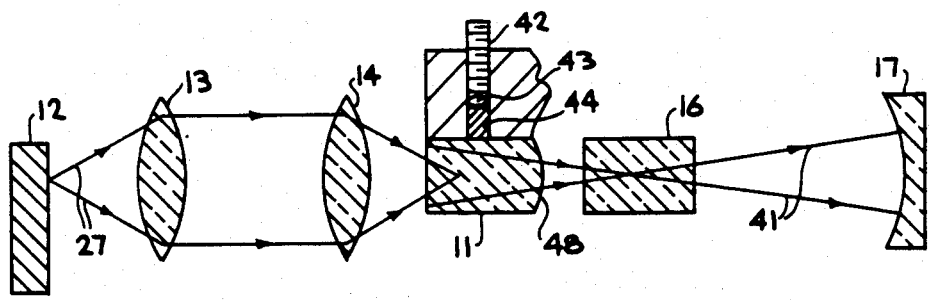
FIGS. 2A, 2B and 2C are schematic sectional views, again in longitudinal orientation, showing the system with alternate means for polarizing the laser beam.
Figure 2B:
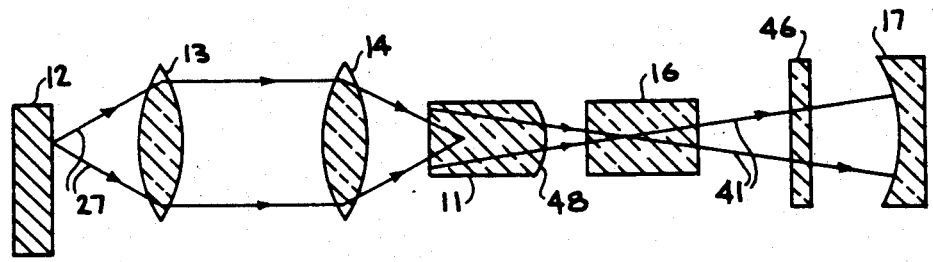
Figure 2C:
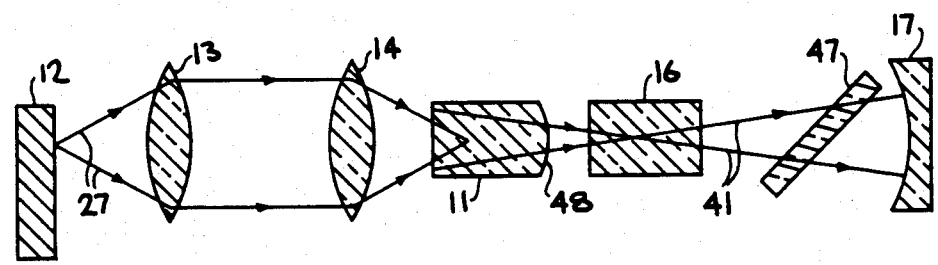

FIGS. 2A, 2B and 2C show schematically the major components of the laser diode and Nd-YAG laser assembly, and indicate three different systems for establishing a polarization in the laser beam 41. In FIG. 2A, as discussed above, the transverse stressing of the Nd-YAG rod itself is illustrated. FIG. 2B shows an alternative method wherein a quarter waveplate 46 is used, between the frequency doubler 16 and the front end mirrored surface 17. FIG. 2C shows the use of a Brewster plate 47, i.e. a piece of glass oriented at Brewster's angle. It is important to control the polarization within the laser cavity.

Another important feature of the invention relates to beam shaping in the laser cavity. As indicated in FIGS. 1 and 2A through 2C, the partially mirrored surface 17 at the output coupler preferably is concave. It is also indicated in these figures and in FIG. 4 that the front end surface 48 of the Nd-YAG laser rod 11 may be convexly curved. The curvature of the front of the Nd-YAG rod, which may be a spherical curvature of about 15 millimeters radius, in effect puts a lens in the laser cavity which tends to focus the radiation. Cooperating with this lens in the shaping of the beam within the cavity is the output coupler mirror 17.

Figure 3:
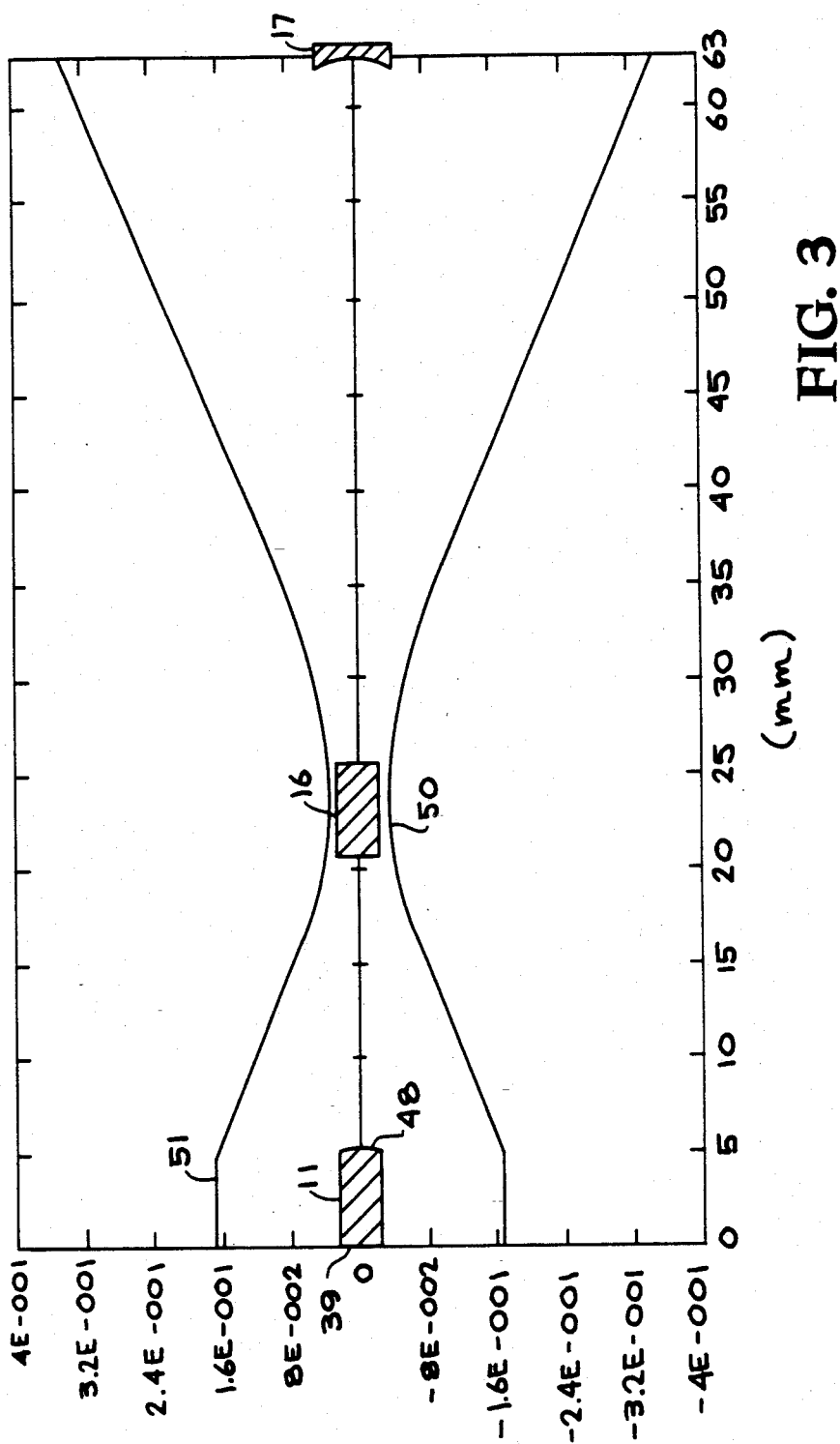
FIG. 3 is a graphic representation of the laser beam shape within the laser cavity, with a beam waist formed between the Nd-YAG rod and an output coupler at the front end of the assembly.

The graph of FIG. 3 shows generally the laser beam 41 in profile within the laser cavity. It illustrates beam shaping to form a beam waist 50, that is, a narrowed portion of the laser beam as it resonates within the laser cavity between the two mirrored surfaces. In the representation of FIG. 3, the rear mirrored surface is assumed to be the flat back surface 39 of the Nd-YAG laser rod.

Varying of the radius of curvature of the lens surface 48 at the front of the laser rod has been found to affect the size of the beam waist 50. A tighter radius of curvature will produce a smaller waist which enhances the frequency doubling process. It has been found advantageous for efficiency of the laser, according to the present invention, to reduce the beam waist 50 to the minimum diameter practicable relative to other design considerations, including permissible ranges of radius at the front end 48 of the laser rod, and to place the KTP frequency doubling crystal at the beam waist. A minimum practicable waist diameter may be about 40 microns for the embodiment shown.

Another aspect of beam shaping according to the present invention relates to matching of beam volume of the resonating beam inside the YAG rod to the size of the laser diode beam exciting the YAG crystal. The combination of the concave output coupler mirror 17 and the lens-shaped end 48 at the front of the YAG rod, with the back 39 of the rod mirrored, enables the beam size at a location 51 on the graph of FIG. 3, i.e within the YAG rod, to be adjusted to the appropriate volume. The beam focused from the laser diode into the YAG crystal must overlap the beam volume 51 inside the laser rod, for efficient excitation of the neodymium atoms within the rod. The pumping volume must be generally the same as the lasing volume. If the laser beam volume within the YAG crystal is too small, the pump volume from the laser diode beam does not match it well and this results in a reduction in the laser's efficiency.

The combination of the lens-shaped end 48 on the laser rod, the output coupler mirror 17 and its radius of curvature, the distance back from the lens 48 to the rear cavity mirror 39 (preferably on the flat back end surface of the YAG rod), which preferably is about 5 millimeters, and the placing of the KTP doubling crystal at the beam waist 50, which is of minimum practicable size, results in a highly efficient frequency doubled laser output. The radius of curvature of the concave mirror 17 at the output coupler, in one preferred embodiment of the invention, preferably is about 37 millimeters. The distance between this concave mirror and the forward end of the KTP crystal may be about 31 millimeters. A KTP crystal of about 5 millimeters length may be used. From the rear of the KTP crystal back to the lens-shaped front of the YAG rod may be about 22 millimeters. As stated above, the YAG rod itself may be of about 5 millimeters length, with a 15 millimeter radius of curvature of the front-end lens 48.

It should be understood that the mirror locations shown and described herein are preferred, but may vary. For example, the rear mirror surface of the laser cavity may comprise a mirror placed somewhere behind the back surface 39 of the Nd-YAG laser rod.

With the laser diode array pumped Nd-YAG laser assembly of the invention, it has been found that for visible low power laser beam output, efficiencies of about 0.5% to 1.0% may be achieved. For example, with about one watt electrical power supplied to the laser diode, which has an efficiency of about 20%, the laser diode output beam will have a power of about 200 milliwatts. In general at these pump levels the 1.06 micron output is approximately 30% of the diode laser output, so that the 1.06 micron output beam has a power of about 60 milliwatts. Thus an efficiency of approximately 5% is achieved for output at 1.06 micron. For efficiency frequency doubling the output coupler is coated to be highly reflective at 1.06 micron and highly transmissive at 0.532 micron. At 200 milliwatts pump levels the intra-cavity 1.06 micron intensity is approximately 10 watts. At this power level the doubling efficiency of the KTP is sufficient to give approximately 10 milliwatts output at 0.532 micron.

At substantially higher power, for example 10 watts of input to the laser diode, a 2-watt output diode beam excites the YAG rod to emit a laser beam of about 600 milliwatts. At this higher power, the frequency doubling crystal is more efficient, and an output in the visible range of about 100 milliwatts can be achieved. Thus, one percent efficiency in a medium-power visible laser is achieved.

At high-power output, the Nd-YAG laser of the invention is considerably more efficient. For example, if 40 watts are input to the laser diode, a laser beam of about 2.4 watts is frequency doubled, and at this power the KTP frequency doubler converts nearly 100 percent of the 1.06 micron output light to the visible. Thus, an output beam of over two watts in the visible range can be achieved, at up to 5% to 6% efficiency.

The system of the invention is also advantageous as producing a laser in the near-infrared range. In this form of the invention, the frequency doubler 16 (in dashed lines in FIG. 1) is eliminated. Thus, the efficiency of the system is limited only by the approximately 20% efficiency of the laser diode, and by the approximately 30% efficiency of the Nd-YAG laser rod itself, for an overall efficiency of nearly 6% regardless of power level.

In one form of such an infrared laser, the ends of the Nd-YAG laser rod may form the two mirrors of the laser cavity. Thus, each end is partially mirrored, defining a cavity within the rod itself. An extremely efficient near-infrared laser thereby results, even more compact than the system shown in FIG. 1, since no output coupler is required.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims:

We claim:

1. A high efficiency, diode pumped array, compact neodymium-YAG laser, comprising,
    a neodymium-YAG laser rod having a front end and a back end, a housing with means holding the neodymium-YAG rod in fixed position in the housing with its front end forward,
    a laser diode array for pumping the neodymium-YAG rod, having an output frequency sufficiently matched to the rod to pump the rod, secured in the housing behind and in optical alignment with the rod,
    output coupler means including a mirrored surface forming a front end of a laser cavity,
    a rear mirror means forming a a back end of the laser cavity, with the neodymium-YAG rod within the cavity,
    a frequency doubler within the laser cavity, positioned to receive the output beam of the laser rod and to halve its wavelength, doubling its frequency, and
    polarization control means for adjusting and maintaining the polarization of the laser beam to a polarization which optimizes frequency doubling of the laser beam by the frequency doubler.

2. The neodymium-YAG laser of claim 1, wherein the laser diode comprises a Ga Al As diode.

3. The neodymium-YAG laser of claim 2, wherein the laser diode has an output beam of substantially 0.808 micron wavelength.

4. The neodymium-YAG laser of claim 3, wherein the laser rod produces an output laser beam of substantially 1.06 microns, in the near infrared range, halved to substantially 0.532 micron in the visible light range by the frequency doubler.

5. The neodymium-YAG laser of claim 1, wherein the frequency doubler comprises a KTP crystal.

6. The neodymium-YAG laser of claim 1, wherein the back end of the Nd-YAG rod is mirrored, forming said rear mirror means, so that the laser cavity is defined between the back of the rod and the mirrored surface at said output coupler means.

7. The neodymium-YAG laser of claim 6, further including beam shaping means within the laser cavity for shaping the laser beam and forming a beam waist in front of the rod.

8. The neodymium-YAG laser of claim 7, wherein the frequency doubler is positioned substantially at the beam waist.

9. The neodymium-YAG laser of claim 7, wherein the beam shaping means includes a convexly-formed front end surface on the laser rod, having a focussing effect on the beam.

10. The neodymium-YAG laser of claim 8, wherein the beam shaping means further comprises said mirrored surface at the output coupler means being concave, oriented inwardly of the laser cavity.

11. The neodymium-YAG laser of claim 1, wherein the polarization means comprises stressing means associated with the housing for applying a transverse compressive stress on the laser rod.

12. The neodymium-YAG laser of claim 11, wherein said stressing means comprises a compression spring secured in the housing and oriented radially of the rod, so as to apply a compressive force on the rod.

13. The neodymium-YAG laser of claim 1, wherein the laser diode has an input of about 10 watts and an output of about 2 watts.

14. The neodymium-YAG laser of claim 1, wherein the laser diode has an input of about one watt and an output of about 200 milliwatts.

15. The neodymium-YAG laser of claim 1, further including diode cooling means for maintaining the diode at a desired temperature to help match it to the Nd-YAG laser rod.

16. The neodymium-YAG laser of claim 1, wherein the overall efficiency of the laser is about 5% to 6%, at about 40 watts input to the diode, the diode being at least about 20% efficient.

17. The neodymium-YAG laser of claim 1, wherein the overall efficiency of the laser is about 1%, at about 10 watts input to the diode and about 2 watts input to the Nd-YAG rod.

18. The neodymium-YAG laser of claim 1, further including beam shaping means associated with the laser cavity for shaping the beam and forming a waist in front of the rod, the frequency doubler being positioned substantially at the beam waist.

19. The neodymium-YAG laser of claim 18, wherein the beam shaping means comprises a convex front end surface on the laser rod, having a focusing effect on the beam, and a concave mirrored surface at the output coupler means, the radii of said front end surface and said concave mirrored surface and the spacing between them being such that the lasing volume of the beam in the rod is increased to better match it to the pumping volume of the laser diode beam and such that a beam waist of minimum size is formed.

20. The neodymium-YAG laser of claim 18, wherein the beam shaping means includes a convex front end surface on the laser rod, having a focussing effect on the beam.

21. The neodymium-YAG laser of claim 20, wherein the convex front end surface of the rod has a radius of curvature of about 10 to 15 mm, and wherein the beam waist is about 40 microns in diameter.

22. The neodymium-YAG laser of claim 21, wherein the beam shaping means also includes a concave surface at said mirrored surface of the output coupler means.

23. A neodymium-YAG diode pumped array laser having high efficiency, comprising,
    a housing,
    a laser diode array secured within the housing, with cooling means for cooling the diode array,
    a laser rod of neodymium-YAG in front of the laser diode array and retained in the housing in the path of the diodes beam, and rod being matched sufficiently to the diodes output such that the diodes will pump the laser rod,
    front and back mirrors forming a laser cavity including the laser rod, and means for expanding a lasing volume of the cavity to match a focussed image from the laser diode array to mode match and achieve TEM$_{00}$ operation.

24. The laser of claim 23, further including a frequency doubler within the laser cavity, in front of the laser rod, so that the laser beam is in the visible light range, and beam polarizing means within the laser cavity.

25. The laser of claim 24, wherein the means for expanding the lasing volume further includes beam shaping means for generally conforming the volume of the beam in the laser rod to that of the pumping beam from the laser diode, for efficient pumping, and for shaping the beam and forming a beam waist in front of the laser rod, with the frequency doubler being substantially at the waist.

26. The laser of claim 24, wherein the polarizing means comprises stressing means associated with the housing for applying a substantially constant transverse compressive stress on the laser rod.

27. The laser of claim 24, wherein the frequency doubler comprises a KTP crystal.

28. The laser of claim 23, wherein the mirror means comprise partially mirrored front and back end surfaces on the laser rod.

29. The laser of claim 23, wherein the mirror means comprise a partially mirrored back end surface on the laser rod and an output coupler having a partially mirrored surface as a front end of the laser cavity, and including a frequency doubler within the laser cavity, to produce a laser beam in the visible light range, and a beam polarizer within the laser cavity.

30. A method for producing a laser beam of high efficiency, comprising,
   forming a laser cavity including a neodymium-YAG laser rod,
   pumping the laser rod with a laser diode having an output frequency sufficiently matched to the rod to pump the rod, thereby producing a near-infrared output beam,
   doubling the frequency of the near-infrared output beam using a frequency doubler within the cavity, and
   adjusting and controlling the polarization of the infrared output beam to a beam polarization which optimizes frequency doubling of the infrared output beam by the frequency doubler.

31. The method of claim 30, wherein the laser diode comprises a Ga Al As diode.

32. The method of claim 31, wherein the laser diode has an output beam of substantially 0.808 micron wavelength.

33. The method of claim 32, wherein the laser rod produces an output laser beam of substantially 1.06 microns, in the near infrared range, halved to substantially 0.532 micron in the visible light range by the frequency doubler.

34. The method of claim 30, wherein the frequency doubler comprises a KTP crystal.

35. The method of claim 30, further including shaping the laser beam to form a beam waist in front of the laser rod.

36. The method of claim 35, wherein the frequency doubler is positioned substantially at the beam waist.

37. The method of claim 35, wherein the shaping of the laser beam includes providing a convexly-formed front end surface on the laser rod, having a focussing effect on the beam.

38. The method of claim 37, wherein the shaping of the beam further includes providing a concave mirrored surface at the front end of the laser cavity oriented inwardly of the laser cavity.

39. The method of claim 30, wherein the polarization is accomplished by applying a transverse compressive stress on the laser rod.

40. The method of claim 39, wherein the transverse compressive stress is applied by a compression spring secured in the housing and oriented radially of the rod, so as to apply a compressive force on the rod.

41. The method of claim 30, wherein the laser diode has an input of about 10 watts and an output of about 2 watts.

42. The method of claim 30, further including maintaining the diode at a desired temperature to help match it to the Nd-YAG laser rod.

43. The method of claim 30, including shaping the beam within the cavity by providing a convex front end surface on the laser rod, having a focusing effect on the beam, and a concave mirrored surface at the front of the cavity, the radii of said front end surface and said concave mirrored surface and the spacing between them being such that the lasing volume of the beam in the rod is increased to better match it to the pumping volume of the laser diode beam and such that a beam waist of minimum size is formed.

44. The method of claim 43, wherein the doubling crystal is located at the beam waist.

45. A method for producing a high-efficiency neodymium-YAG laser beam, comprising,
   forming a laser cavity including a neodymium-YAG laser rod, and
   pumping the laser rod with a laser diode matched sufficiently to the laser rod to pump the rod, and maintaining the diode at a desired temperature to help match it to the laser rod, the diode being at least about 20% efficient and having an output beam with a wavelength of about 0.8 micron,
   thereby producing a laser beam in the near-infrared range.

46. The method of claim 45, further including doubling the frequency of the near-infrared laser beam using a frequency doubler within the laser cavity, in front of the laser rod, so that the laser beam is in the visible light range, and including polarizing the beam within the laser cavity.

47. The method of claim 45, wherein the laser cavity is formed by partially mirrored front and back end surfaces on the laser rod.

* * * * *

UNITED STATES PATENT AND TRADEMARK OFFICE
CERTIFICATE OF CORRECTION

PATENT NO. : 4,653,056

DATED : March 24, 1987

INVENTOR(S) : Thomas M. Baer and Mark S. Keirstead

It is certified that error appears in the above-identified patent and that said Letters Patent is hereby corrected as shown below:

In claim 1, at Column 7, line 16, "diode pumped array" should read --diode array pumped--.

In claim 2, at Column 7, line 42, "laser diode" should read --laser diode array--.

In claim 3, at Column 7, line 44, "laser diode" should read --laser diode array--.

In claim 13, at Column 8, line 14, "laser diode" should read --laser diode array--.

In claim 14, at Column 8, line 17, "laser diode" should read --laser diode array--.

In claim 15, at Column 8, lines 20-21, "the diode" should read --the diode array--.

In claim 16, at Column 8, line 25, "to the diode, the diode being" should read --to the diode array, the diode array being--.

In claim 17, at Column 8, line 29, "the diode" should read --the diode array--.

In claim 23, at Column 8, line 57, "diode pumped array" should read --diode array pumped--; at Column 8, line 64, "diodes beam" should read --diodes' beam--; and at Column 8, line 65, "diodes output" should read --diodes' output--.

UNITED STATES PATENT AND TRADEMARK OFFICE
CERTIFICATE OF CORRECTION

PATENT NO. : 4,653,056

DATED : March 24, 1987

INVENTOR(S) : Thomas M. Baer and Mark S. Keirstead

It is certified that error appears in the above-identified patent and that said Letters Patent is hereby corrected as shown below:

In claim 25, at Column 9, line 13, "laser diode" should read --laser diode array--.

Signed and Sealed this

Twenty-second Day of August, 1989

Attest:

DONALD J. QUIGG

Attesting Officer

Commissioner of Patents and Trademarks

REEXAMINATION CERTIFICATE (1333rd)
United States Patent [19]
Baer et al.

[11] B1 4,653,056
[45] Certificate Issued Jul. 24, 1990

[54] LASER DIODE PUMPED SOLID STATE LASERS
[75] Inventors: Thomas M. Baer, Mountain View; Mark S. Keirstead, San Jose, both of Calif.
[73] Assignee: Spectra-Physics, Inc., San Jose, Calif.

Reexamination Request:
No. 90/001,830, Aug. 24, 1989

Reexamination Certificate for:
Patent No.: 4,653,056
Issued: Mar. 24, 1987
Appl. No.: 730,002
Filed: May 1, 1985

Certificate of Correction issued Mar. 24, 1987.

[51] Int. Cl.$^5$ .............................................. H01S 3/091
[52] U.S. Cl. .................................. 372/75; 372/92; 372/101
[58] Field of Search ............. 372/34, 75, 71, 92, 372/70, 69, 108, 101, 98

[56] References Cited
U.S. PATENT DOCUMENTS
4,739,507 4/1988 Byer et al. ............................ 372/22

OTHER PUBLICATIONS

L. J. Rosenkrantz, GaAs diode-pumped Nd:YAG laser, J. Appl. Phys., vol. 43, No. 11, (Nov. 1972), pp. 4603–4605.
G. I. Farmer and Y. C. Kiang, Low-current density LED-pumped ND:YAG laser using a solid cylindrical reflector, J. Appl. Phys., vol. 45, No. 3, (Mar. 1974), pp. 1357–1371.
S. R. Chinn, Intracavity second-harmonic generation in a ND pentaphosphate laser, Appl. Phys. Lett., vol. 29, (1976), pp. 176–179.
Wm. Culshaw et al., Efficient Frequency-Doubled Single-Frequency ND:YAG Laser, IEEE Journal of Quantum Electronics, vol. QE-10, No. 2, (Feb. 1974), pp. 253–262.
Welch et al., High external efficiency (36%) 5 micron mesa isolated GaAs quantum well laser by organometallic vapor phase epitaxy, Appl. Phys. Lett. 46, No. 2, 15, (Jan. 1985), pp. 121–123.
K. Washio et al., Room temperature cw operation of an efficient miniaturized ND:YAG laser end-pumped by a superluminescent diode, Appl. Phys. Lett., vol. 29, No. 11, 1, (Dec. 1976), pp. 720–722.
Zhou et al., Efficient, frequency-stable laser-diode-pumped ND:YAG laser, Optics Letters, vol. 10, No. 2, (Feb. 1985), pp. 62–64.

*Primary Examiner*—Léon Scott, Jr

[57] ABSTRACT

A neodymium YAG laser is pumped by a matched laser diode of high efficiency, resulting in a compact, high-efficiency and long-lifetime laser assembly. Output is in the near infrared range, but can be converted to the visible spectrum by an internal frequency doubler. A doubling crystal, which may be a KTP crystal, is placed at an optimum location in the laser cavity. Polarization of the beam may be achieved simply by stressing the YAG rod, prior to frequency doubling.

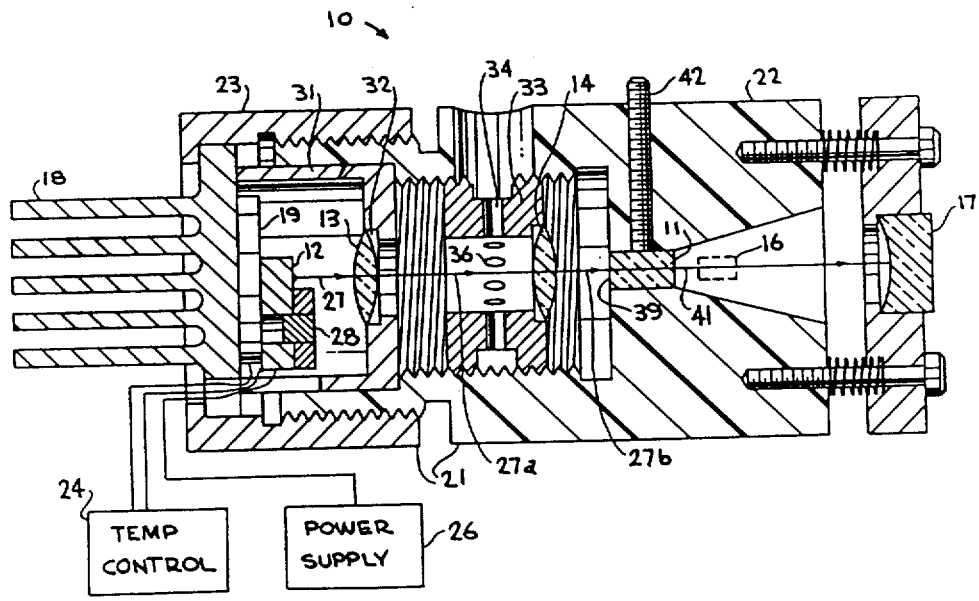

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–44 is confirmed.

Claim 45 is determined to be patentable as amended.

Claims 46 and 47, dependent on an amended claim, are determined to be patentable.

45. A method for producing a high-efficiency neodymium-YAG laser beam, comprising,
  forming a laser cavity including a neodymium-YAG laser rod, and
  pumping the laser rod with a laser diode *array* matched sufficiently to the laser rod to pump the rod, and maintaining the diode *array* at a desired temperature to help match it to the laser rod, the diode *array* being at least about 20% efficient and having an output beam with a wavelength of about 0.8 micron, thereby producing a laser beam in the near-infrared range.

* * * * *